(12) United States Patent
Meier et al.

(10) Patent No.: US 9,325,551 B2
(45) Date of Patent: Apr. 26, 2016

(54) REMOVAL OF IRRELEVANCE IN PHASE-MODULATED DIGITAL CARRIER-SIGNALS

(71) Applicant: Intel Corporation, Santa Clara, CA (US)

(72) Inventors: Stefan Meier, Neubiberg (DE); Matthias Schoebinger, Munich (DE); Lajos Gazsi, Duesseldorf (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/133,106

(22) Filed: Dec. 18, 2013

(65) Prior Publication Data

US 2015/0172083 A1    Jun. 18, 2015

(51) Int. Cl.
*H04L 27/20* (2006.01)
*H04L 27/233* (2006.01)

(52) U.S. Cl.
CPC ........ *H04L 27/2337* (2013.01); *H04L 27/2003* (2013.01)

(58) Field of Classification Search
CPC ..... H04L 27/20; H04L 27/2003; H04L 27/36; H04L 27/18; H04L 27/22; H04B 14/006
USPC ........ 375/279, 280, 281, 298, 308, 229, 332; 332/144; 455/42, 110, 205; 329/304, 329/345

See application file for complete search history.

(56) References Cited

U.S. PATENT DOCUMENTS

| 6,560,296 B1 * | 5/2003 | Glas et al. ..................... 375/308 |
| 7,046,970 B2 * | 5/2006 | Nguyen et al. ................ 455/110 |
| 7,409,012 B2 * | 8/2008 | Martin et al. ................. 375/308 |

* cited by examiner

*Primary Examiner* — Betsy Deppe
(74) *Attorney, Agent, or Firm* — Schwegman Lundberg & Woessner, P.A.

(57) ABSTRACT

This application discusses, among other things, apparatus and methods for suppressing irrelevant edges of a phase modulated signal. In an example, a method can include receiving phase modulation information at a suppression circuit of a communication device, computing distances between transitions of a phase modulation signal, the phase modulation signal associated with the phase modulation information, comparing the distances to a threshold distance at a comparator of the suppression circuit, and suppressing a first transition of the phase modulation signal associated with the phase modulation information if a first distance is less than the threshold distance.

20 Claims, 6 Drawing Sheets

REMOVAL OF IRRELEVANCE IN PHASE-MODULATED DIGITAL CARRIER-SIGNALS

BACKGROUND

Conceptually the task of a direct digital modulation scheme can be accomplished based on the proper selection of edges from a uniform grid of edge positions aligned to a base oscillator frequency and temporal distance between the edge positions based on phase-modulation information. Phase-modulation in general creates phase-jumps in the carrier-signal and can significantly reduce distance between signal edges to be generated from the distance between edges of the base oscillator signal. These reduced distances between edges can require an increase in speed of about a factor of two in the phase modulation circuitry that can include multiplexers and address-computation modules in the selection logic.

OVERVIEW

This application discusses, among other things, apparatus and methods for suppressing irrelevant edges of a phase modulated signal. In an example, a method can include receiving phase modulation information at a suppression circuit of a communication device, analyzing or computing distances between transitions of a phase modulation signal, the phase modulation signal associated with the phase modulation information, comparing the distances to a threshold distance at a comparator of the suppression circuit, and suppressing a first transition of the phase modulation signal associated with the phase modulation information if a first distance is less than the threshold distance.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized that certain phase jumps associated with phase modulation can be disregarded and eliminated. Such elimination of phase-jump related phenomenon can significantly reduce the speed constraints of direct digital modulation circuitry. Direct digital modulation (DDM) circuitry can be used in a variety of electronic devices. Communication devices including wireless communication devices can employ direct digital modulation. In principle, large frequency swings in a modulated signal can correspond to large variations of temporal distances between subsequent edges, or transitions, in the time domain including close to zero distances. The latter would result in a considerable challenge regarding the related implementation of the DDM. Frequency limitation of such swings is one brute force approach that has been considered to allow such modulation to be accomplished within the speed constraints of existing phase modulation devices. Such a solution can reduce the variation of temporal distances and increase the minimum value accordingly, however, at the expense of nonlocal processing and a related deterioration of error vector magnitude (EVM) and adjacent channel leakage ratio (ACLR). Instead, the present subject matter proposes to avoid small temporal distances via removal of irrelevant edges in the sense that the removal of the irrelevant edges does neither exhibit any degradation of far-off noise spectrum and ACLR nor EVM. In certain examples, the removal of irrelevant edges allows relaxing the requirements in terms of required speed for phase modulation circuitry. In some examples, edges with shorter distance can be removed as in these time-points the corresponding amplitude-signal in the polar transmitter is zero or close to zero. Signal components to be multiplied with a value of zero or close to zero can be removed without any significant change in performance.

Figure 1:
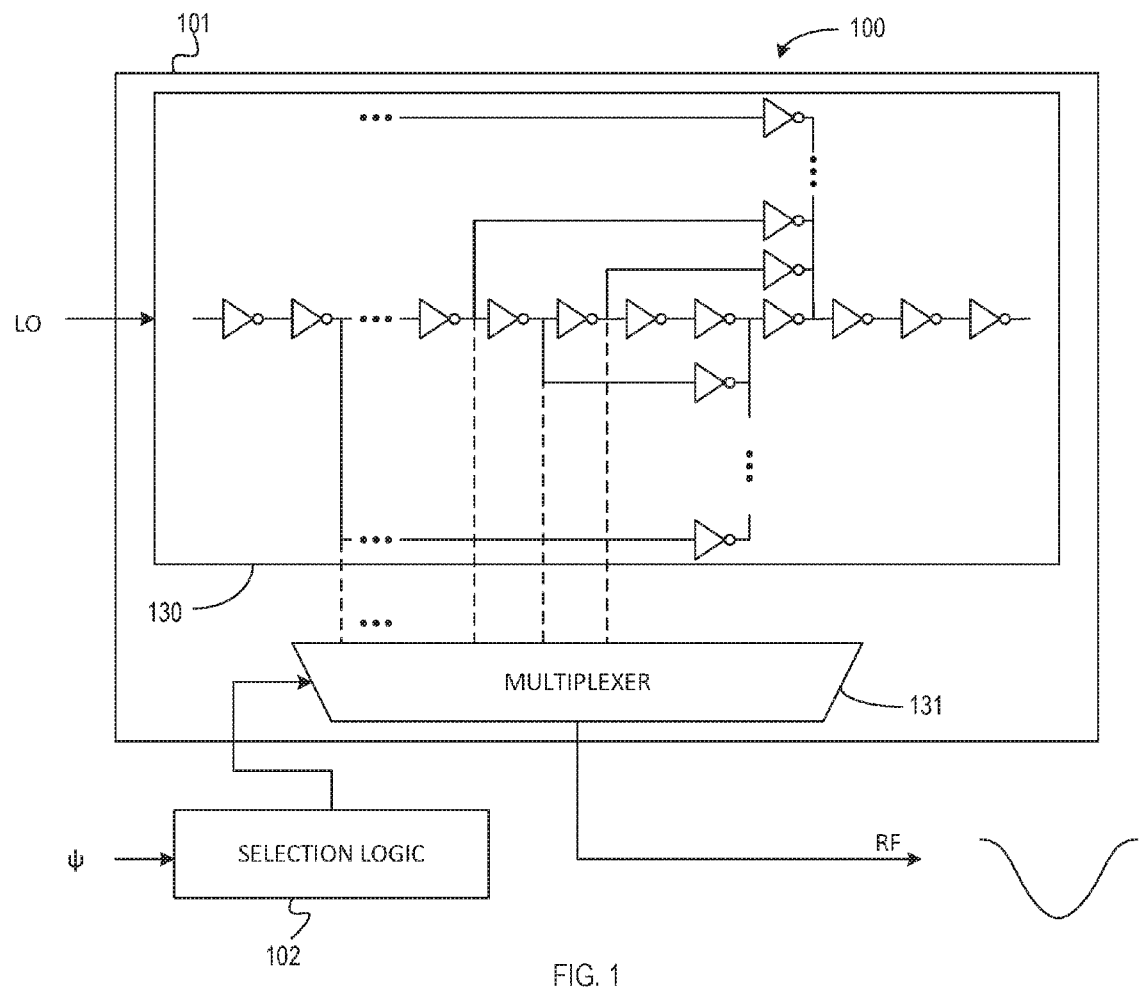
FIG. 1 illustrates an example system for providing digital phase modulation of a carrier signal.

FIG. 1 illustrates an example system 100 for providing digital phase modulation of a carrier signal (RF). The system can include an oscillator (not shown) for providing a reference signal (LO), a delay element 101, and selection logic 102. In certain examples, the delay element 101 can include a digital-to-time converter (DTC). In some examples, the delay element 101 can include a delay line 130 and a multiplexer 131. In certain examples, the delay line 130 can be configured to generating multiple, delayed phase transitions related to the reference signal (LO). In some examples, the multiplexer can provide one or more of the multiple delayed phase transitions to the output of the delay element 101 based on selection inputs to the multiplexer 331. In certain examples, the selection logic 102 can receive phase modulation information (ψ) and can select one or more of the delayed phase transitions to couple to an output of the system based on the phase modulation information (ψ) to provide the phase modulated carrier signal (RF). In certain examples, if the phase modulation information (ψ) includes a phase ramp, the phase modulated output signal can be used to generate a periodic signal with a frequency shifted from the frequency of the reference signal (LO). In some examples, the phase modulation information can be used to modulate phase of an output signal of a transmitter such as a polar transmitter.

Typically a phase modulated RF signal can be written as, $$y = \sin(\omega t + \text{phi}_{mod}(t)),$$

where ω is the carrier frequency and $\text{phi}_{mod}(t)$ represents the phase modulation signal. In certain examples, the modulation signal $\text{phi}_{mod}(t)$ can be a time-varying signal generated in the base-band signal-processing and up-sampled and processed in a digital front-end, such as a digital signal processor (DSP). In classical phase modulation constellations like BPSK, QPSK, as well as in combined phase and amplitude-modulation systems, the transition from one point in the modulation constellation during one symbol to another point in the constellation in the next symbol might generate trajectories in the constellation that pass the origin very close to zero.

Passing the origin of the coordinates very close to zero causes, in a polar representation, a change of the angle values (phase) of nearly 180° or π in a very short time. Applying this phase to modulate a carrier-signal can result in a modulated signal with phase-jumps. As the un-modulated signal and the modulation signal are independent and not correlated, these phase-jumps might happen in any random position. In some cases the phase jump can be very close to the nearest zero-transition.

In general, modulation changes the periodicity of a carrier signal, and phase-jumps can reduce distances between two falling or two rising edges to nearly 50% of the period-duration of the un-modulated carrier signal. In applications with digital modulation by means of Digital-to-Time-Converters (DTC) and similar solutions the reduced distance between edges challenges the requirements for throughput-rate in the computation of addresses for the DTC.

For modulation related phase jumps, each phase jump can occur at time-points where the amplitude of the signal is zero or close to zero. As such, transitions of the modulated signal associated with the phase jumps as well as associated with short distances between certain transitions, can be removed. Removing these edges does not influence the quality of the modulated signal because these edges would be combined with amplitude values around zero.

In addition to phase modulation phase-jumps, insufficient up-sampling is another cause that can give rise to a narrow pulse, or short distances between certain transitions, in a phase modulated signal. Insufficient up-sampling can give rise to phase-jumps that include time-points that are not associated with a zero or near zero amplitude. However, many up-sampling induced phase-jumps can be reduced because their contribution to the signal spectrum is far removed from the frequency range of interest of the modulated signal.

Figure 2A:
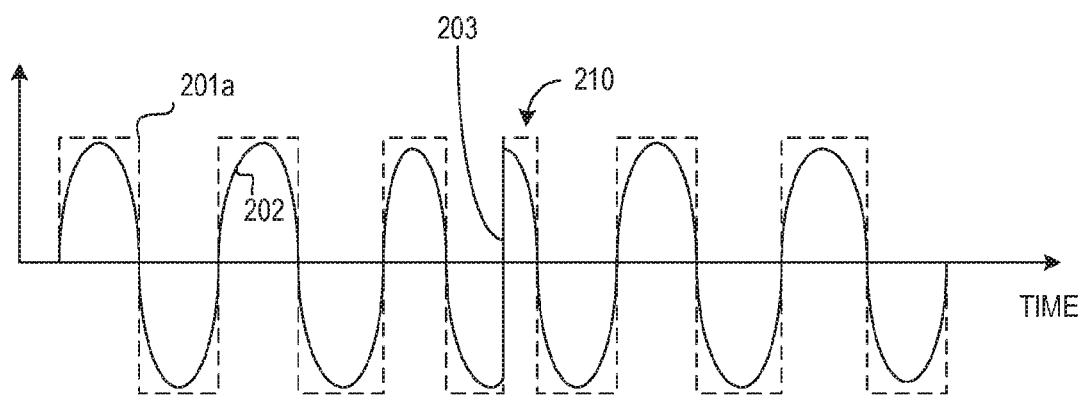
FIGS. 2A and 2B illustrate generally a modulated output signal before and after suppression of an edge.
Figure 2B:
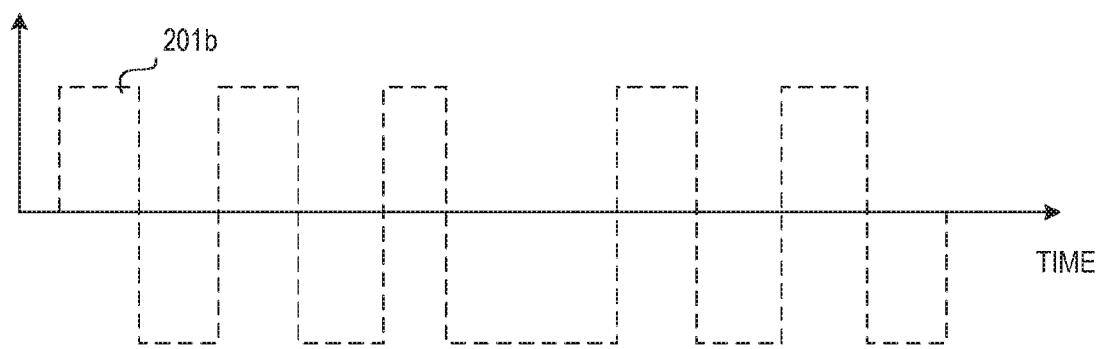

FIG. 2A illustrates generally a modulated output signal 201a including a narrow pulse 210 resulting from a phase shift 203 executed by a delay element of a system configured to provide phase modulation of a reference signal. The phase shift 203 of the delayed representation of the reference signal 202 by the delay element causes the rising edge or transition of the narrow pulse 210 to be very close in time-wise distance to both the previous falling edge and previous rising edge. In addition, the time-wise difference between the rising edge and the falling edge of the narrow pulse 210 is much shorter that the average transition distance of the other edges. Such short transition distances require using circuits that are much faster than the average speed needed to handle most of the other transition distances. Such fast circuits can also consume much more energy than components capable of handling the average transition distances of the modulated output signal 201a. As described above, however, if a transition distance is detected that is less than a predetermined threshold related to the reference signal, a pair of edges can be removed without significantly compromising the quality of the phase modulated signal. FIG. 2B illustrates an example of a phase modulated output signal 201b, such as the one illustrated in FIG. 2A, with the irrelevant edge and a second identified corresponding edge suppressed or removed. With the irrelevant edge removed, the speed constraints of the processing circuitry of a phase modulation system can be relaxed and can be much lower than the speed constraints with the narrow pulse 210.

In general, the process of edge-removal is a local operation and once a first edge or transition is identified as irrelevant because of a short time-wise distance between transitions, a second edge is identified and removed with the first edge. In certain examples, removal of irrelevant edges or transitions can begin by identifying two rising or two falling edges that have less than a predetermined percentage of the distance of two rising edges of the un-modulated carrier. In some examples, the predetermined percentage can be 80% or less. Simulations using a predetermined percentage between 80% and 90% have successfully removed edge or transition pairs while not influencing quality parameters such as Adjacent Channel Leakage Ratio (ACLR) and the Error Vector Magnitude (EVM). Some results do show an increase of about 1 db in the output signal in far-off frequency regions.

In some examples, the predetermined percentage can be about 90% or less. It is understood that other percentages can be used without departing from the scope of the present subject matter. Numerous simulations were performed for various parameters like modulations-scheme, up-sampling of phase values and different limits for removal of edges between 80% and 90%. Simulation results indicated that the example methods presented here for removal of irrelevant edges does not influence the Adjacent Channel Leakage Ratio (ACLR) and the Error Vector Magnitude (EVM), which are two important parameters in the LTE standard specification. The only measurable influence in removing edges according to the example methods is an increase of around 1 dB in the far-off frequency regions.

Figure 3A:
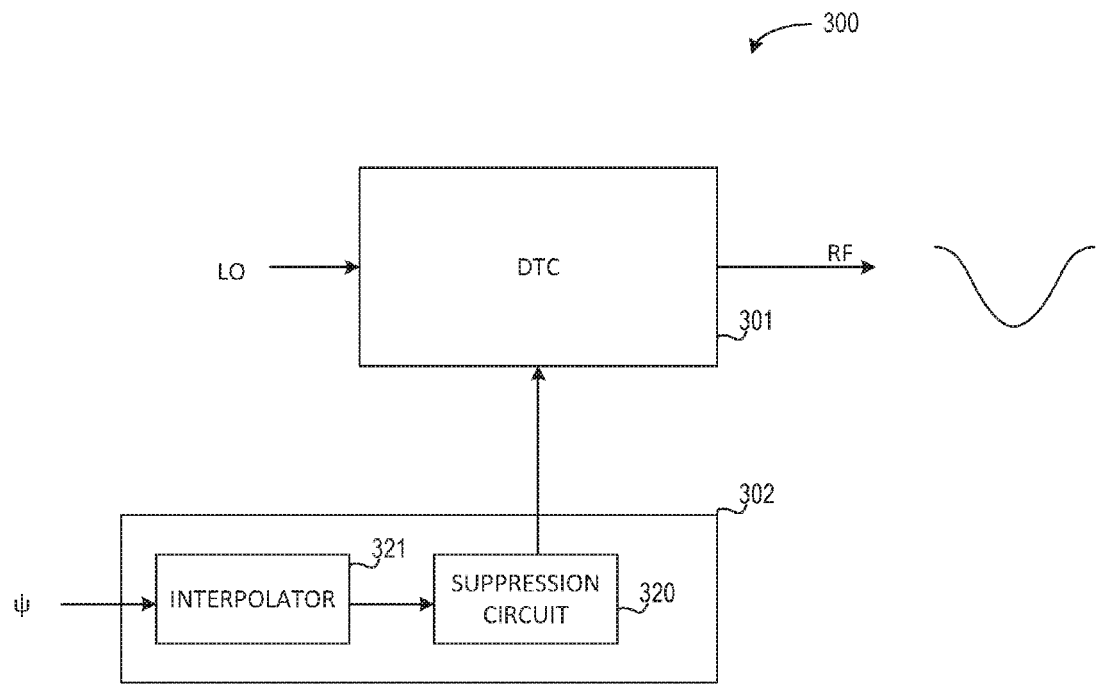
FIGS. 3A and 3B illustrate phase modulation systems including an example suppression circuit.
Figure 3B:
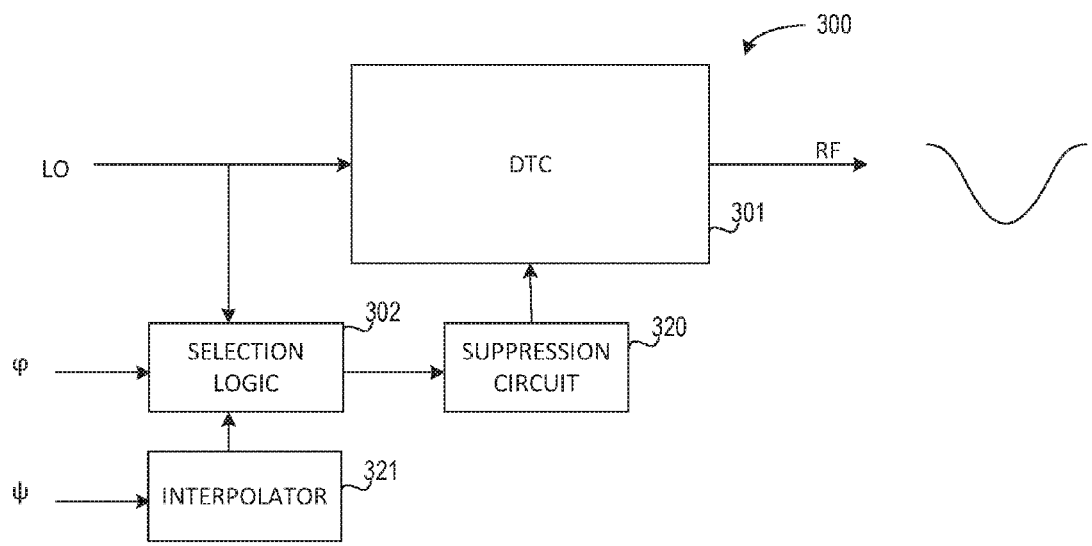

FIGS. 3A and 3B illustrate phase modulation systems 300 including an example suppression circuit 320. FIG. 3A illustrates a system including a delay element such as a DTC 301 and selection logic 302 including the suppression circuit 320. In certain examples, the DTC 301 can receive a reference signal (LO) such as from a local oscillator, can receive selection information from the selection logic 302, and can provide a phase modulated signal (RF). In certain examples, the selection logic 302 can include an interpolator 321 to up-sample phase modulation information 4) to provide the proper selection resolution to the DTC 301. Both the phase modulation information 4) and the interpolator 321 can introduce phase jumps in the output phase modulated signal (RF). In certain examples, the suppression circuit 320 can detect phase jumps, for example, by comparing time-wise edge differences of the phase modulation information 4) represented by the up-sampled selection information and can modify the selection information provided to the DTC 301 such that irrelevant edges of the up-sampled phase modulation information are suppressed before being passed on to the DTC 301.

FIG. 3B illustrates a phase modulation system 300 that includes selection logic 302 such as tap selection circuitry that allows not only phase modulation based on received phase modulation information 4) but also allows phase shifting base on phase ramp information ((p) received by the tap selection circuit. Phase shifting allows the carrier frequency of the phase modulated signal (RF) to be offset from the frequency of the local oscillator signal (LO). Phase shifting can provide advantages in transmitters by allowing the transmit frequency amplified at the output of the transmitter to be significantly different than the local oscillator frequency, thus, reducing pulling effects of the transmit power amplifier to circuitry that would normally be running at the about the same frequency of the power amplifier or a harmonic thereof, such as the local oscillator. In certain examples, the suppression circuit 320, can analyze edge distances and interrupt the tap selection information to suppress irrelevant edges in the phase modulated signal (RF).

Figure 4:
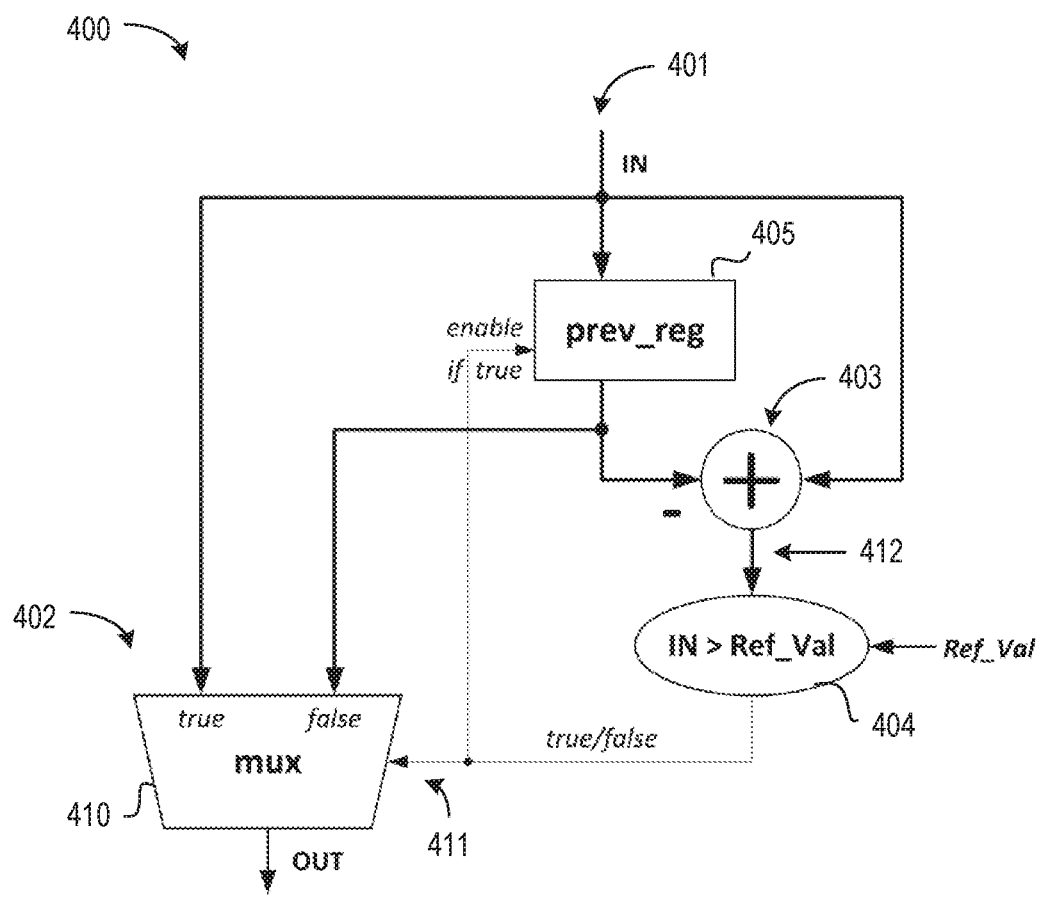
FIGS. 4 and 5 illustrate generally flowcharts of example methods of suppressing irrelevant edges of a phase modulated signal.

FIG. 4 illustrates generally a flowchart of an example method 400 of suppressing irrelevant edges of a phase modulated signal. The method 400 can include at 401 receiving current phase modulation information (IN) such as tap selection information for a DTC. In certain examples, the current phase modulation information (IN) can be provided from a baseband processor, digital signal processor, or an interpolator such as an interpolator of a polar transmitter. At 402, the method 400 can include providing output phase modulation information from a suppression multiplexor (mux) 410 of a suppression circuit based on a selection input 411 wherein the output phase modulation information (OUT) is selected from the current phase modulation information (IN) and a sample of saved phase modulation information (prev_reg). The method 400 at 403, can include comparing the saved phase modulation information (prev_reg) with the current phase modulation information (IN). In certain examples, the saved phase modulation information (prev_reg) can be subtracted from the current phase modulation information (IN) to provide difference information (diff) 412. At 404, the difference information (diff) 412 can be compared to threshold information (Ref_Val). In certain examples, the comparison can provide suppression selection information (true/false) for controlling the suppression multiplexer 410. If the difference information (diff) 412 does not suppress the current modulation information (IN), the current modulation information (IN) can be passed by the suppression multiplexer 410 to provide the output modulation information (OUT), and at 405, the current modulation information (IN) can be stored to become the stored modulation information (prev_reg) for subsequent analysis of the modulation information. If the difference information (diff) 412 suppresses the current modulation information (IN), the saved modulation information (prev_reg) can be passed or can continue to be passed by the suppression multiplexer to provide the output modulation information (OUT).

Figure 5:
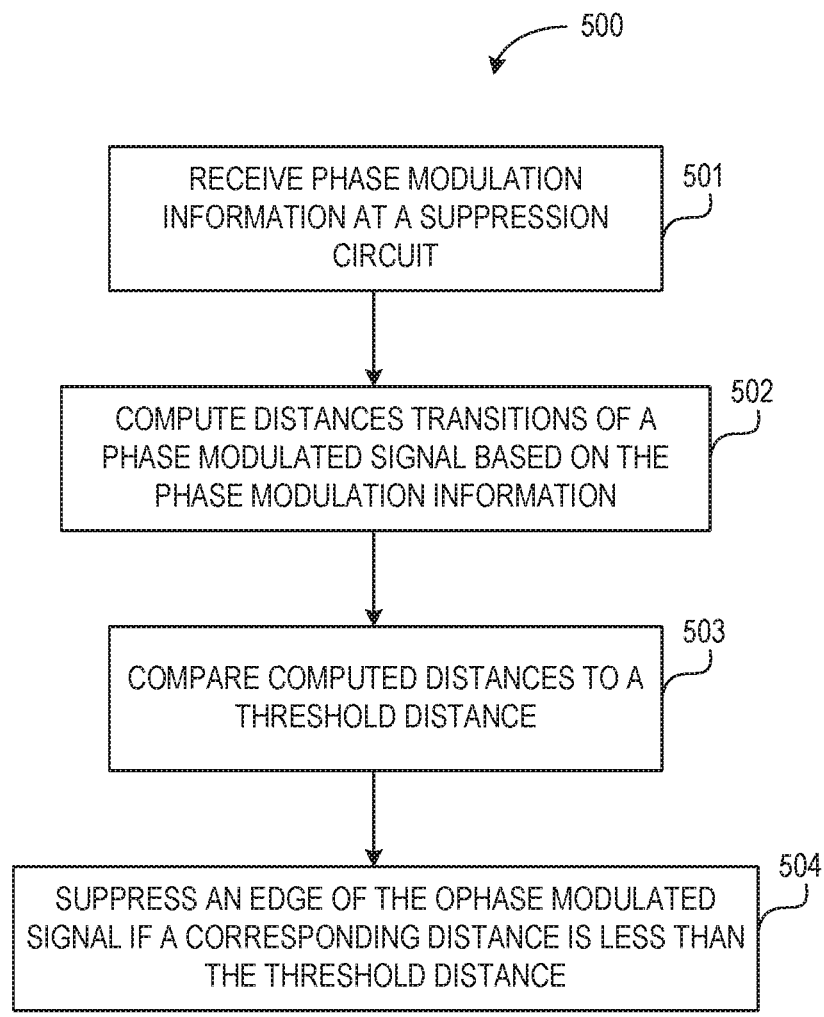

FIG. 5 illustrates generally a flowchart of an example method 500 of suppressing irrelevant edges from a phase modulated signal. At 501, the method can include receiving phase modulation information, or a representation of phase modulation information at a suppression circuit. At 502, the method 500 can include analyzing or computing distances between edges or transitions of a potential phase modulation signal based on the received phase modulation information using the suppression circuit. At 503, the computed distances can be compared to a threshold difference. At 504, if a computed distance between edges of the potential phase modulated signal is less than the threshold distance, an edge associated with the computed distance can be suppressed or removed from the actual phase modulated signal. Removal or suppression of edges from a phase modulated signal can relax speed constraints associated with phase modulation circuitry to be relaxed. In turn, the phase modulation circuitry can provide comparable performance to that of higher cost, higher speed circuitry.

Figure 6:
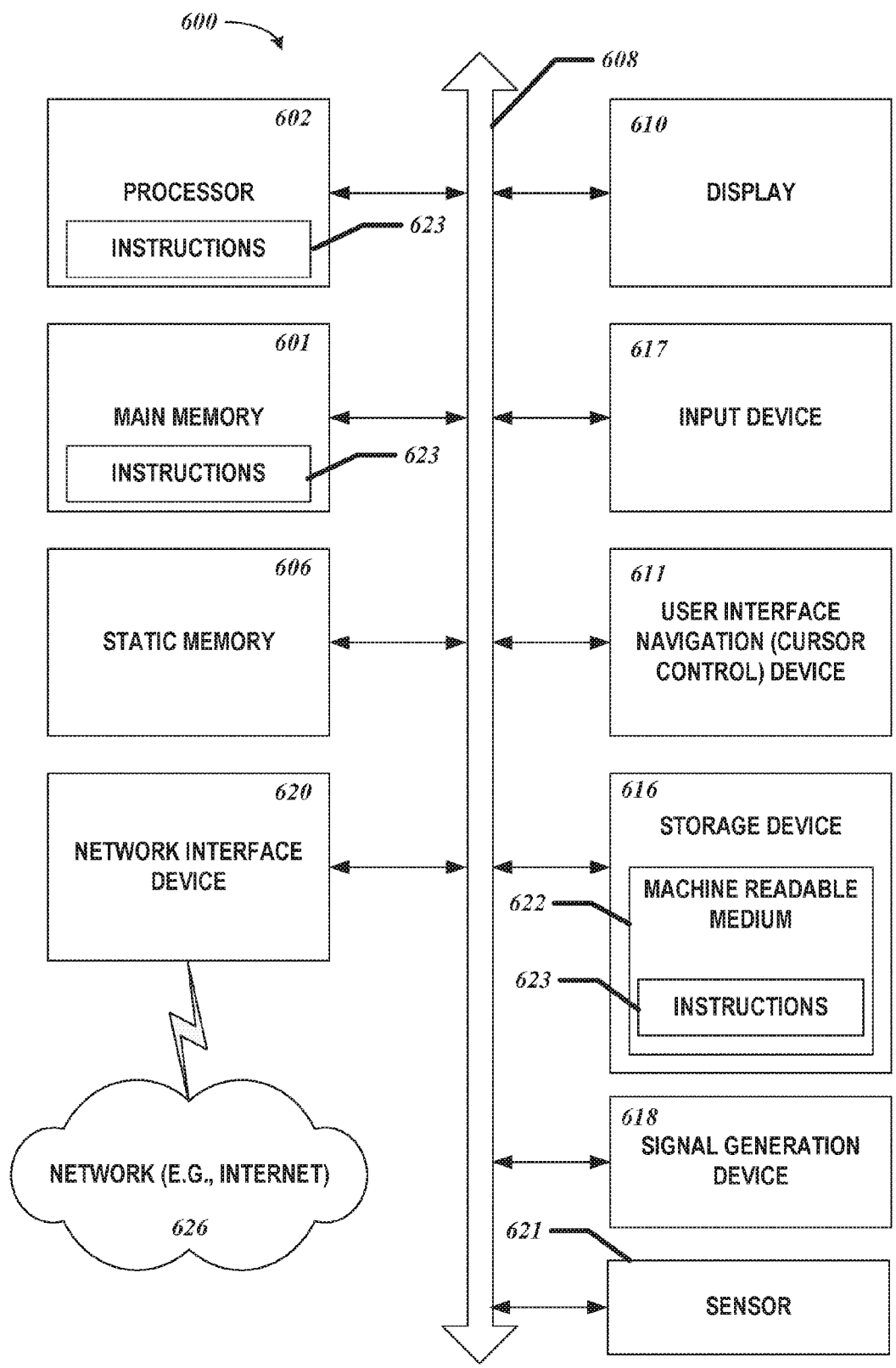
FIG. 6 is a block diagram illustrating an example machine upon which any one or more of the methodologies herein discussed may be executed.

FIG. 6 is a block diagram illustrating an example machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. In certain examples, the computer system 600 may additionally include a storage device (e.g., drive unit) 616, a signal generation device 618 (e.g., a speaker), a network interface device 620, and one or more sensors 621, such as a global positioning system sensor, compass, accelerometer, or other sensor.

The storage device 616 includes a machine-readable medium 622 on which is stored one or more sets of data structures and instructions 623 (e.g., software) embodying or utilized by any one or more of the methodologies or functions described herein. The instructions 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 623. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Electrically Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

In certain examples, the central processor 602 can include one or more processors or processor circuits including a processing circuit configured to remove irrelevance from phase-modulated carrier signals of the example computer system 600.

ADDITIONAL NOTES

In Example 1, a method can include receiving phase modulation information at a suppression circuit of a communication device, computing distances between transitions of a phase modulation signal, the phase modulation signal associated with the phase modulation information, comparing the distances to a threshold distance at a comparator of the suppression circuit, and suppressing a first transition of the phase modulation signal associated with the phase modulation information if a first distance is less than the threshold distance.

In Example 2, the method of Example 1 optionally includes identifying a second transition of the phase modulation signal time-wise adjacent the first transition using the phase modulation information.

In Example 3, the method of any one or more of Examples 1-2 optionally includes suppressing the second transition of the phase modulation signal.

In Example 4, the identifying a second transition of the phase modulation signal time-wise adjacent the first edge of any one or more of Examples 1-3 optionally includes identifying a second transition time-wise closest to the first transition using the phase modulation information.

In Example 5, the suppressing the second transition of the phase modulation signal of any one or more of Examples 1-4 optionally includes interrupting selection of a digital-to-time converter (DTC) tap of a DTC using a multiplexer of the DTC.

In Example 6, the suppressing a first transition of the phase modulation signal of any one or more of Examples 1-5 optionally includes interrupting selection of a digital-to-time converter (DTC) tap of a DTC using a multiplexer of the DTC.

In Example 7, the communication device of any one or more of Examples 1-6 optionally includes a wireless transmitter.

In Example 8, the communication device of any one or more of Examples 1-7 optionally includes a polar transmitter.

In Example 9, an apparatus can include a control circuit configured to receive first phase modulation information and to provide tap selection information to a delay element for providing a phase modulated signal, wherein the control circuit includes a suppression circuit configured to analyze the first phase modulation information to determine transition distances between time-wise adjacent transitions of the phase modulated signal using the phase modulation information, and to suppress one or more transitions of the phase modulation signal that are associated with transition distances that are shorter than a threshold distance.

In Example 10, the apparatus of any one or more of Examples 1-9 optionally include an interpolator configured to receive second phase modulation information having a first sampling rate and to provide the first phase modulation information having a second sampling rate, wherein the first sampling rate and the second sampling rate are different.

In Example 11, the apparatus of any one or more of Examples 1-10 optionally includes a digital-to-time converter (DTC) having the delay element.

In Example 12, the DTC of any one or more of Examples 1-11 optionally includes a multiplexer configured to receive the tap selection information.

In Example 13, the suppression circuit of any one or more of Examples 1-12 optionally is configured to interrupt the tap selection information to suppress one or more of the transitions of the phase modulated signal.

In Example 14, a method of suppressing transitions of a phase modulated signal can include receiving phase modulation information representing transitions of the phase modulated signal at a suppression circuit, subtracting, using the phase modulation information, location information of a first transition of the phase modulated signal from location information for a current transition of the phase modulated signal to provide a difference value, comparing the difference value to a threshold value, if the difference value is greater than the threshold value, providing the phase modulation information representative of the current transition at an output of suppression circuit, and if the difference value is less than the threshold value, continuing to provide phase modulation information representative of the first transition at the output of the suppression circuit.

In Example 15, the method of any one or more of Examples 1-14 optionally include, if the difference value is greater than the threshold value, storing at least a portion of the phase modulation information associated with the current transition as the location information of the first transition.

In Example 16, the method of any one or more of Examples 1-5 optionally includes selecting a delay tap of a delay element using the phase modulation information at the output of the suppression circuit.

In Example 17, a computer-readable storage device including instructions stored thereon, which when executed by at least one processor cause the processor to perform operations that can include receiving phase modulation information of a communication device, computing distances between transitions of a modulation signal associated with the phase modulation information, comparing the distances to a threshold distance, and suppressing a first transition of the phase modulation signal associated with the phase modulation information if a first distance is less than the threshold distance.

In Example 18, the operations of any one or more of Examples 1-17 optionally include identifying a second transition of the phase modulation signal time-wise adjacent the first transition using the phase modulation information.

In Example 19, the operations of any one or more of Examples 1-18 optionally include suppressing the second transition of the phase modulation signal.

In Example 20, the instructions for identifying a second transition of the phase modulation signal time-wise adjacent the first edge of any one or more of Examples 1-19 optionally include instructions for identifying a second transition time-wise closest to the first transition using the phase modulation information.

In Example 21, the instructions for suppressing the second transition of the phase modulation signal of any one or more of Examples 1-22 optionally include instructions for interrupting selection of a digital-to-time converter (DTC) tap of a DTC using a multiplexer of the DTC.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:
   receiving phase modulation information;
   determining a plurality of distances between a plurality of transitions of a phase modulation signal, the phase modulation signal associated with the phase modulation information;
   comparing the plurality of distances to a threshold distance at a comparator of an adjustment circuit; and
   adjusting at least one transition of the plurality of transitions if a first distance associated with the at least one transition is less than the threshold distance.

2. The method of claim 1, wherein the adjusting at least one of the plurality of transitions includes adjusting selection of a digital-to-time converter (DTC) tap of a DTC using a multiplexer of the DTC to adjust the one transition.

3. The method of claim 1, wherein the adjusting at least one of a plurality of transitions includes interrupting selection of a digital-to-time converter (DTC) tap of a DTC using a multiplexer of the DTC.

4. The method of claim 1, wherein receiving phase modulation information includes receiving phase modulation information of a wireless transmitter.

5. The method of claim 1, wherein receiving phase modulation information includes receiving phase modulation information of a polar transmitter.

6. The method of claim 1, wherein the adjusting at least one of the plurality of transitions includes suppressing at least one of the plurality of transitions.

7. An apparatus comprising:
   an adjustment circuit configured to receive first phase modulation information and to provide second phase modulation information to a delay element for providing a phase modulated signal,
   wherein the adjustment circuit is further configured to analyze the first phase modulation information to determine a plurality of transition distances between a plurality of transitions of the phase modulated signal using the phase modulation information, and
   to adjust one or more transitions of the plurality of transitions that are associated with the plurality of transition distances that are shorter than a threshold distance and one transition distance of the one or more transition distances is based on the one or more transitions.

8. The apparatus of claim 7, including an interpolator configured to receive second phase modulation information having a first sampling rate and to provide the first phase modulation information having a second sampling rate, wherein the first sampling rate and the second sampling rate are different from one another.

9. The apparatus of claim 7, including a digital-to-time converter (DTC), wherein the delay element includes the DTC.

10. The apparatus of claim 9, wherein the DTC includes a multiplexer configured to receive the second phase modulation information.

11. The apparatus of claim 10, wherein the adjustment circuit is configured to interrupt the second phase modulation information to suppress one or more of the transitions of the phase modulated signal.

12. A method of adjusting transitions of a phase modulated signal, the method comprising:
   receiving phase modulation information representing a plurality of transitions of the phase modulated signal at an adjustment circuit;
   subtracting, using the phase modulation information, location information of a first transition of the plurality of transitions from location information for a current transition of the phase modulated signal, to provide a difference value;
   comparing the difference value to a threshold value;
   if the difference value is greater than the threshold value, providing the phase modulation information representative of the current transition at an output of adjustment circuit; and
   if the difference value is less than the threshold value, continuing to provide phase modulation information representative of the first transition at the output of the adjustment circuit.

13. The method of claim 12, including, if the difference value is greater than the threshold value, storing at least a portion of the phase modulation information associated with the current transition as the location information of the first transition.

14. The method of claim 12, including selecting a delay tap of a delay element using the phase modulation information at the output of the adjustment circuit.

15. A computer-readable storage device including instructions stored thereon, which when executed by at least one processor cause the processor to perform operations comprising:
   receiving phase modulation information of a communication device;
   computing distances between transitions of a modulation signal associated with the phase modulation information;
   comparing the distances to a threshold distance; and adjusting a first transition of the phase modulation signal associated with the phase modulation information if a first distance of the computed distances is less than the threshold distance and the first distance is based on the first transition.

16. The storage device of claim 15, wherein the operations further include identifying a second transition of the phase modulation signal time-wise adjacent the first transition using the phase modulation information.

17. The storage device of claim 16, wherein the operations further include suppressing the second transition of the phase modulation signal.

18. The storage device of claim 16, wherein the identifying a second transition of the phase modulation signal time-wise adjacent the first edge includes identifying a second transition time-wise closest to the first transition using the phase modulation information.

19. The storage device of claim 18, wherein the suppressing the second transition of the phase modulation signal includes interrupting selection of a digital-to-time converter (DTC) tap of a DTC using a multiplexer of the DTC.

20. A computer-readable storage device of claim 15, wherein the adjusting a first transition includes suppressing the first transition of the phase modulation signal associated with the phase modulation information if a first distance is less than the threshold distance.

* * * * *